United States Patent [19]
Trumper et al.

[11] Patent Number: 6,066,998
[45] Date of Patent: May 23, 2000

[54] MAGNETIC ACTUATOR WITH LONG TRAVEL IN ONE DIRECTION

[75] Inventors: David L. Trumper, Plaistow, N.H.; Lawrence S. Schwartz, Marina del Rey, Calif.

[73] Assignee: Massachusetts Institute of Technology, Cambridge, Mass.

[21] Appl. No.: 08/712,852

[22] Filed: Sep. 12, 1996

[51] Int. Cl.[7] .............................. F16C 39/00; H01F 7/00; H01F 7/08

[52] U.S. Cl. ......................... 335/229; 335/222; 335/232; 310/13; 310/14; 310/15; 310/22; 310/23; 310/24

[58] Field of Search .............................. 310/90.5, 12, 13, 310/14, 15, 20, 22, 23, 24; 335/229–234, 222, 223

[56] References Cited

U.S. PATENT DOCUMENTS 4,387,935   6/1983   Studer .................................... 310/90.5

OTHER PUBLICATIONS

Schwartz, L.S., Magnetic Optical Bearing (MOB) Design for Mirror Wavelength Scans in a Spaceborne Interferometer, MIT, May 1995.

*Primary Examiner*—Michael L. Gellner
*Assistant Examiner*—Raymond Barrera
*Attorney, Agent, or Firm*—Wolf, Greenfield & Sacks, P.C.

[57] ABSTRACT

An actuator made up of a plurality of actuator elements is provided which actuator provides long travel in one dimension and short travel in five additional dimensions, with each actuator element providing long travel in the one dimension and short travel in at least two additional dimensions. For preferred embodiments, each actuator element includes a suspension core, the long travel being in one linear dimension and each actuator element providing short travel in two additional linear dimensions and at least one rotary dimension. More particularly, each actuator element includes an electrodynamic drive for providing controlled movement in the first dimension, which drive includes a voice coil mounted in a voice coil gap and at least one elongated high permeability core which is movable in the first dimension with respect to the voice coil; an electromagnetic drive for providing controlled movement in the at least one additional dimension (and in the two additional linear dimensions and at least one rotary dimension for preferred embodiments), which drive includes at least one high permeability suspension core spaced from the at least one elongated core by small gaps and windings for selectively inducing fluxes in the small gaps; and a magnetic source for providing bias flux to both the voice coil gap and the small gaps.

42 Claims, 11 Drawing Sheets

MAGNETIC ACTUATOR WITH LONG TRAVEL IN ONE DIRECTION

This invention was made with government support under contract Number F19628-90-C-0002 awarded by the United States Air Force. The government has certain rights in the invention.

FIELD OF THE INVENTION

This invention relates to magnetic actuators and more particularly to an actuator element for providing long travel in one direction or dimension and short travel in at least one second dimension and to a combination of such actuator elements for performing long travel in the one dimension and short travel in the other five dimensions.

BACKGROUND OF THE INVENTION

There are many applications where precise movement and/or positioning in one dimension or direction is required while being able to correct for small errors which may occur in one or more additional dimensions. Ideally, it should be possible to correct for errors in all five additional rigid-body dimensions. The long movement may for example be for distances ranging from a fraction of a centimeter (for example 0.5 centimeters) to several ten's of centimeters, with the movements for error correction being for example in the 500 micron range. However, these dimensions, which vary with application, can differ significantly from the examples given.

One such application is to control the scanning mirror in an interferometer. While various flexure, air bearing and other mechanisms are available for performing this actuator function, magnetic bearings offer a number of advantages, particularly for applications in vacuum or low pressure environments such as space satellite instrumentation, and in applications where long life and reliability are critical because of the difficulty in making repairs, space again being an example of such an application. The advantages of magnetic bearings include the absence of friction and wear, and the fact that lubrication is not required. Gas or air bearings, which have many of the same advantages, are not suitable for use in vacuum applications. A magnetic actuator can also be simpler, since it is designed to control multiple degrees of freedom with only a single moving part, whereas complex flexures may be required to accomplish this task in conventional systems.

While many magnetic actuators for moving in a single direction have been provided in the past, and some of these actuators have also had the ability to correct for small positioning errors in dimensions other than that of the long travel, most of these devices have used independent mechanisms for accomplishing these functions and this has limited the magnetic efficiency of the actuators. The elements required for generating the independent flux paths for the two types of motion has also increased the size and weight of such devices, factors which are undesirable in applications such as satellite instrumentation. The independent flux paths have also increased the power requirements for many of these prior art magnetic actuators. Adding redundancy to provide high reliability for space or other applications where servicing of the actuator is difficult or impossible has, because of the design of such actuators, resulted in significant increases in size and weight, and in power requirements.

A need therefore exists for an improved magnetic actuator which permits precise travel over a selected range in a first dimension, while permitting small adjustments to be made in position in at least one and preferably all five additional dimensions, which device has high magnetic efficiency, preferably utilizing the same flux path for the motion in both directions, is relatively compact and light in weight, has relatively low power requirements and can have significant redundancy built in to enhance long term reliability without major increases in the actuator's size, weight or power requirements.

SUMMARY OF THE INVENTION

In accordance with the above, this invention provides an actuator element for providing long travel in a first dimension and short travel in at least one additional dimension. The actuator element includes an electrodynamic drive for providing controlled movement in the first dimension, which drive includes at least one voice coil mounted in one or more voice coil gaps and at least one elongated high permeability core which is moveable in the first dimension with respect to the voice coil; an electromagnetic drive for providing controlled movement in the at least one additional dimension which drive includes at least one high permeability suspension core spaced from the at least one elongated core by small gaps, and windings for selectively inducing fluxes in the small gaps; and a magnetic source for providing bias flux to both the voice coil gaps and the small gap(s). The magnetic source may include at least one permanent magnet mounted to the elongated core on at least one side of the voice coil gap(s). For preferred embodiments the permanent magnet is elongated in the first direction.

The actuator element may also include a means for reducing magnetic flux in the at least one suspension core to prevent saturation of the electromagnetic drive. The means for reducing magnetic flux may include shims for diverting magnetic flux away from the suspension cores by providing a reduced magnetic permeability by-pass for the suspension cores. The shims may provide at least one by-pass gap which by-pass gap is much shorter and much narrower than the voice coil gap, may provide at least one narrow low-permeability by-pass for the suspension cores or may be permanent magnet shims.

For some embodiments of the invention, the voice coil and at least one suspension core are stationary and the at least one elongated core and magnetic source are connected to form part of a moving platen. The at least one elongated core may include a center core around which the voice coil is wound and a pair of outer return cores, voice coil gaps being formed between the center core and each return core. For this embodiment, each suspension core may include a pair of high permeability E-cores spaced from the center core and the return core by small gaps and a permanent magnet may be mounted to each return core between the return core and the center core.

For other embodiments, the electrodynamic drive provides controlled movement in one linear dimension and the electromagnetic drive provides controlled movement in two additional linear dimensions and in at least one rotary dimension. For these embodiments, the at least one suspension core has poles angled to provide force components in both of the two additional linear dimensions. The at least one elongated core may be laminated to provide superior high frequency response in at least the two additional linear dimensions and other cores, including the suspension cores, may also be laminated. Windings may be provided either on sufficient ones of the pole pieces or between sufficient ones of the pole pieces to provide controlled forces in the at least two additional linear dimensions and in the at least one rotary dimension. For some embodiments, there are at least two of the elongated cores, at least one of which passes through a voice coil, with each suspension core having at least two pole pieces adjacent each elongated core, the pole pieces being shaped and angled relative to the corresponding elongated core to apply forces thereto having components in the two additional linear dimensions when currents are applied to windings corresponding to the pole pieces. A permanent magnet may be affixed to each elongated core on the side thereof adjacent the other elongated core.

For other embodiments, there is a single elongated core having magnets mounted to opposite sides thereof, with the elongated core and magnets passing through a voice coil. The elongated core passes through the pole pieces of the at least one suspension core, with the pole pieces being shaped and angled to apply forces to the elongated core having components in the two additional linear dimensions. The at least one suspension core may have a substantially circular internal opening through which at least the elongated core passes, which opening is slotted to form pole pieces. The elongated core may have substantially circular sides adjacent the pole pieces and, where large rotary motions are desired, the substantially circular sides may be flared. Alternatively, the elongated core may have sides which angle outward from the top and bottom to a point, with the suspension cores having pole pieces forming a small gap with each angled side. For these embodiments, a pair of return cores substantially parallel to the elongated core and spaced therefrom are provided, the return cores terminating at, and preferably being in contact with, the at least one suspension core.

An actuator providing long travel in a first dimension and short travel in five additional dimensions may be formed by inter-connecting at least three actuators of the typed described above in a manner such that all of the actuators have their long travel in said first dimension. Alternatively, for preferred embodiments, the actuator has at least one electrodynamic drive of the type indicated above, and at least two electromagnetic drives each providing controlled movement in at least one additional dimension, with the drives being spaced from each other along the at least one elongated core, with voice coils being provided between the drives or otherwise along the cores, and with the magnetic source providing a bias flux to the voice coil gap and to the small gaps for all electromagnetic drives. For preferred embodiments, the electrodynamic drive provides controlled movement in one linear dimension and the electromagnetic drives each provide controlled movement in two additional linear dimensions and in at least one rotary dimension, the suspension cores for such electromagnetic drive have poles angled to provide force components in both of said two additional linear dimensions.

The foregoing other objects, features and advantages of the invention will be apparent from the following more particular description of preferred embodiments of the invention as illustrated in the accompanying drawings.

IN THE DRAWINGS

DETAILED DESCRIPTION

Figure 1:
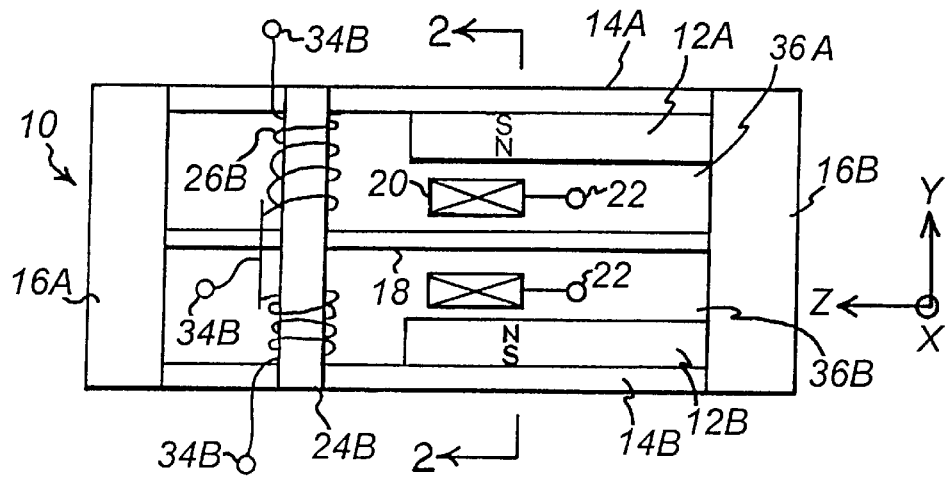
FIG. 1 is a side view of a two dimensional magnetic actuator element in accordance with a first embodiment of this invention.
Figure 2:
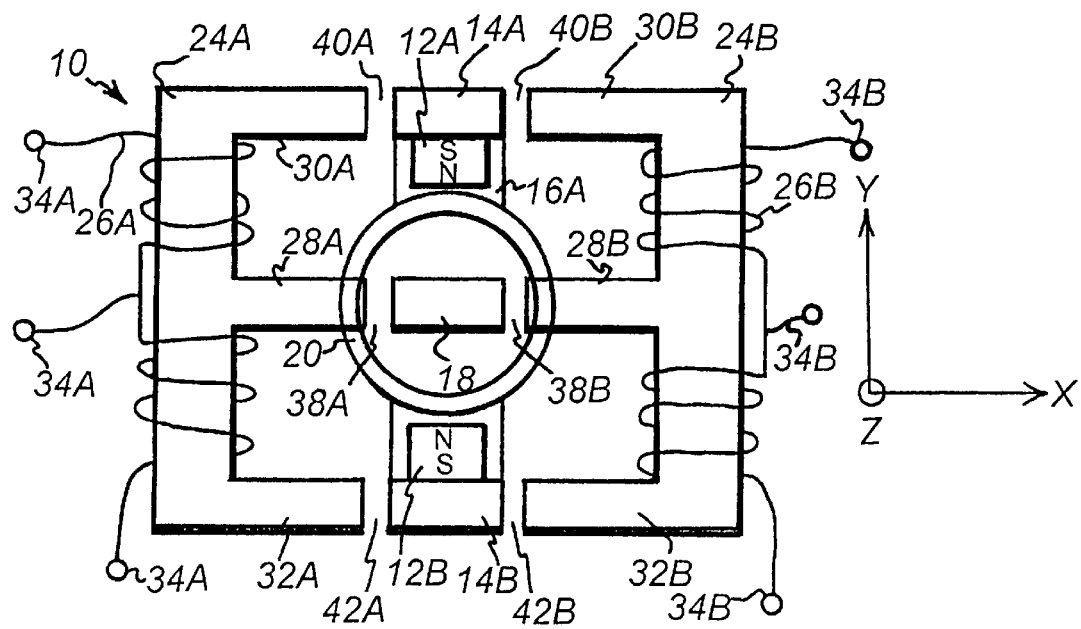
FIG. 2 is a sectional view of the actuator element taken along the line 2—2 in FIG. 1.

Referring first to FIGS. 1 and 2, a three degree of freedom magnetic actuator element 10 is shown for a first embodiment of the invention which element provides long travel in the Z direction and which provides short travel in the X direction, and small rotations $\theta_Z$. The actuator includes a pair of permanent magnets 12A and 12B which are preferably poled as shown. Each magnet 12 is mounted to a corresponding high permeability core 14A–14B formed of iron or other suitable material. Cores 14 extend between and are supported by a pair of non-magnetic end plates 16A and 16B. End plates 16 also support a high permeability center core 18 around which is mounted a voice coil 20. Electric current is applied to voice coil 20 through terminals 22. The final components of the actuator element are a pair of E-cores 24A, 24B having electrical winding 26A, 26B wrapped on the portions thereof connecting their respective center legs 28A, 28B to their respective upper legs 30A, 30B and lower legs 32A, 32B. Current is applied to each of the windings 26 through terminals 34A, 34B, respectively. Three terminals are shown for the windings on each E-core so upper and lower currents can be varied independently.

The flux path for each of the magnets 12 is from the north face of the magnet through the first or voice coil gap 36A, 36B, respectively to center core 18; through center core 18 and small second air gaps 38A, 38B to center legs 28A, 28B of E-core 24A and 24B, respectively; the flux flowing from legs 28 in both directions through the E-cores to the corresponding outer legs 30 and 32; through corresponding small gaps 40A, 40B and 42A, 42B to cores 14A and 14B; and returning through the cores 14 to the south face of corresponding magnets 12. Magnets 12 thus provide bias flux through both voice coil air gaps 36, which operate with voice coils 20 to provide electrodynamic drive for the actuator elements in the Z direction, and to provide a bias flux for gaps 38, 40 and 42 which, in conjunction with the E-cores 24 and windings 26, provide an electromagnetic drive in the X direction and also provide for rotation about center core 18 in the θz dimension.

In operation, voice coil 20 and E-cores 24 are stationary for a preferred embodiment of the invention and the remaining elements are movable. However, this is not a limitation on the invention and all that is required is that the voice coil 20 be movable relative to magnets 12 and center core 18 and that E-cores 24 be movable relative to magnets 12 and cores 14 and 18. However, having the elements with windings thereon carrying electric current be stationary is considered preferable, particularly for satellite instrumentation, since it is easier to remove heat from stationary elements than from moving elements. However, this reason is not as important in applications where heat removal is less critical or less difficult.

When an electric current is applied to voice coil 20 through terminals 22, standard Lorentz forces are created which forces are a function of both the magnetic field, which is assumed to be uniform to the gaps 36A and 36B, and the current applied to coil 20. With the magnetic fields in gaps 36 being in the Y direction, the forces are in the Z direction, the forces being either to the left in FIG. 1 or to the right in FIG. 1 depending on the direction in which current flows through the windings of coil 20. With coil 20 stationary as for the preferred embodiment, the Lorentz forces generated result in the platen formed by end plates 16A, 16B, cores 14A, 14B, magnets 12A, 12B and center core 18 moving in the Z direction. If an AC current is applied to terminals 22, the platen will move back and forth in a scanning motion and the mirror of an interferometer can for example be connected to one of the end plates 16 to perform a scan. Short bursts of DC current may also be provided to move the platen to a precisely controlled Z position. As will be discussed later, a standard laser position transducer may be utilized to detect the Z position of the platen, and this information fed through a suitable control to permit current to be applied to voice coil 20 until a desired position is reached. Control systems will be discussed later in conjunction with FIG. 8.

Similarly, a standard capacitive sensor probe or other suitable sensor mechanism may be utilized to detect the X position of an end plate 16 or other suitable portion of the actuator element platen. With two or more such detectors, rotational position of the platen can be detected. The outputs from the detectors are applied, as will be discussed later, to suitable control circuitry, for example digital control circuitry, which causes currents to be applied to appropriate ones of terminals 34 of a proper magnitude and direction so as to supplement the bias fluxes in gaps 38, 40 and 42 in a manner so as to restore the platen to a desired X position and rotational position. The desired position may, for example, be one where all six of the gaps 38, 40 and 42 are of the same size.

One advantage of the applicant's invention is that, while the forces applied to move the platen when current is applied to the windings on the E-cores are normally proportional to the square of the applied currents, with the bias fluxes applied to the cores and the gaps, these forces are substantially linearly proportional to current. This significantly simplifies the control algorithm and provides greater accuracy of operation. It also results in less current and less power being required to achieve a given level of control. One potential problem with the electromagnet position control is that it is sensitive to offset of the platen element from a desired position and the greater the offset, the more force, and therefore the more current, is required to restore the platen elements to their desired position. While sensors should prevent large offsets from occurring before corrective action is taken, the system needs to be designed so as to be able to deal with the forces required for a maximum offset condition.

Figure 3:
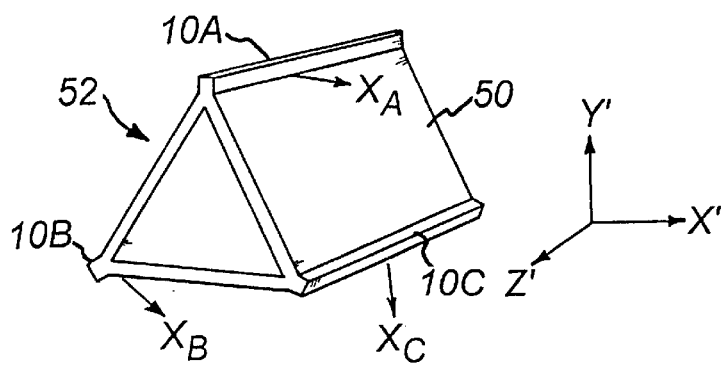
FIG. 3 is a perspective view of part of a six dimensional actuator which utilizes three actuator element of the type shown in FIGS. 1 and 2 to achieve the six degrees of freedom.

FIG. 3 illustrates how three actuator elements 10A–10C of the type shown in FIGS. 1 and 2 may be interconnected by a triangular platen frame 50 formed of a material having low magnetic permeability to form an actuator 52 with six degrees of freedom. In particular, the actuator 52 is capable of long travel in the Z' direction which is the same as the Z direction for each of the actuator element 10 and can also provide short movement and rotary movement for each of the actuator elements in the actuator element's X direction. The X-direction for each actuator is shown as $X_A$, $X_B$, $X_C$, respectively and is mutually perpendicular to the Z' direction and the surfaces of elements 10A, 10B, 10C, respectively. Thus, by properly combining the X direction movements for one or more of the actuator elements 10A–10C, any positional error in the X'Y' plane can be corrected for. Similarly, proper actuation of all three actuator elements can correct a roll error $\theta_z'$. Pitch $\theta_x'$ and yaw $\theta_z'$ errors can be compensated by selective actuation of the voice coils for two or more of the actuator elements 10A–10C. An actuator with six degrees of freedom is thus provided which can compensate for drifts in position over time or as a result of environmental conditions so as to maintain for example accurate operation of a scanning mechanism over extended periods of time. This is accomplished with a device which has no friction or wear, no lubricants, can operate in a vacuum environment, and which can also operate with relatively low power. The actuator is thus ideally suited for use in hostile environments such as space where maintenance, repair or replacement are difficult or impossible to perform.

One additional advantage of the actuator shown in FIG. 3 for applications requiring long-term error free performance is that the actuator can provide some degree of redundancy. For example, the voice coils can be wound in redundant pairs on each actuator such that if one of the voice coils fails, the remaining voice coils can still provide movement in the Z direction and control of the pitch and yaw motions. Similarly, if the windings 26 fail for an actuator element 10A–10C, the other two actuator elements can still be used to perform most of the corrections. Alternately, the actuator elements can be wound with redundant coils. However, the long term reliability of the actuator can be further enhanced by adding additional actuator elements 10 in forming the device 52. Thus, instead of a triangle, the platen 50 could be a square with an actuator element at each of its corners, or preferably a pentagon or a hexagon, again having an actuator at each of its corners. A star shaped platen with an actuator element 10 at each point of the star if also possible. Other shapes for the platen 50 and positions for the actuator elements on the platen are also possible while still permitting the actuator 52 to achieve the desired results. Thus, while three actuator elements are all that are required in order to achieve six degrees of freedom, in applications where maintenance free performance is required over very long time periods, the additional redundancy of four or more actuators is preferable. Redundant sets of control coils can also be wound on the same actuator cores to achieve redundancy.

One potential problem with the embodiment of the invention shown in FIGS. 1 and 2 is that it is desirable to maximize the bias flux in the voice coil gaps 36 consistent with the available voice coil power in order to maximize the drive force in the Z direction. However, high magnetic flux can saturate the E-cores 24 and their poles facing the small gaps 38, 40 and 42. These elements will saturate at magnetic fluxes far below that required to saturate the cores from the voice coil gap. One solution to this problem is to select materials for the cores, and in particular the E-cores 24, which saturate at as high a flux density as possible. While a material such as vanadium permendur has a very high saturation flux density of about 2.2 Tesla, this material is quite expensive and difficult to work with. Silicon iron which saturates at about 1.6 T is a good compromise material in that it has a relatively high saturation flux density while still being relatively inexpensive and easy to obtain. High magnetic flux may also overwhelm the available control currents in coils 26.

However, even with E-cores having a high saturation flux density, saturation of the E-cores is still a potential problem. One simple way to deal with this problem is to increase the size of the gaps 38, 40 and 42. This also has the advantage of increasing the corrective movement which can be obtained from the actuator element 10. However, normally these gaps should be made as small as possible in order to reduce power consumption, and to maximize the flux in the voice coil gap.

Therefore, one of a number of other techniques can be employed to permit small gaps to be utilized without saturating the E-cores, these techniques normally involving dumping or bypassing excess permanent magnet flux rather than having it all directed into and through the E-cores. FIGS. 4, 5, 6 and 7 illustrate various technique for accomplishing this objective.

Figure 4:
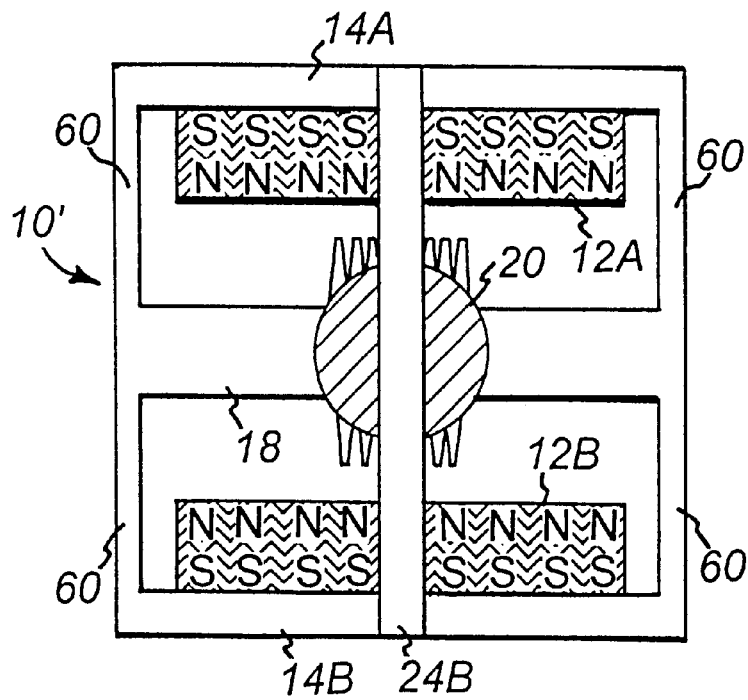
FIG. 4 is a side view of a magnetic actuator element for a first alternative to the embodiment of the invention shown in FIG. 1.

Referring first to FIG. 4, it is seen that the fore and aft ends of the actuator element 10' have relatively narrow shims 60 which may be extensions of cores 14, either in addition to or instead of end plates 16. The shims 60 create an alternate path for the permanent magnet flux to return from the center core 18 to the cores 14 which is made thin enough so as to intentionally be saturated in operation, thereby limiting the amount of flux which is shunted. However, for preferred embodiments, up to 80 percent of the flux may be shunted through the shims 60.

Figure 5:
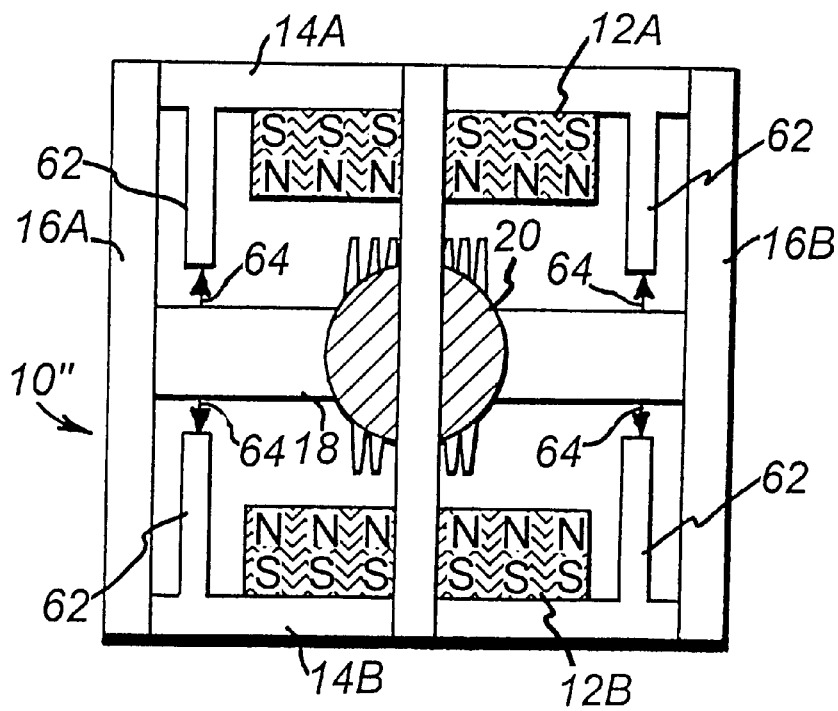
FIG. 5 is a side view of a magnetic actuator element for a second alternative to the embodiment of the invention shown in FIG. 1.

FIG. 5 shows an actuator element similar to that of FIG. 4 except that the iron shims 62 do not extend all the way to center core 18, there being a small gap 64 between each of the shims 62 and the center core 18. However, the shims 62 and gaps 64 function in substantially the same way as the shims 60 to shunt a selected percentage of the magnetic flux from the E-cores 24 so as to prevent saturation of these elements.

Figure 6:
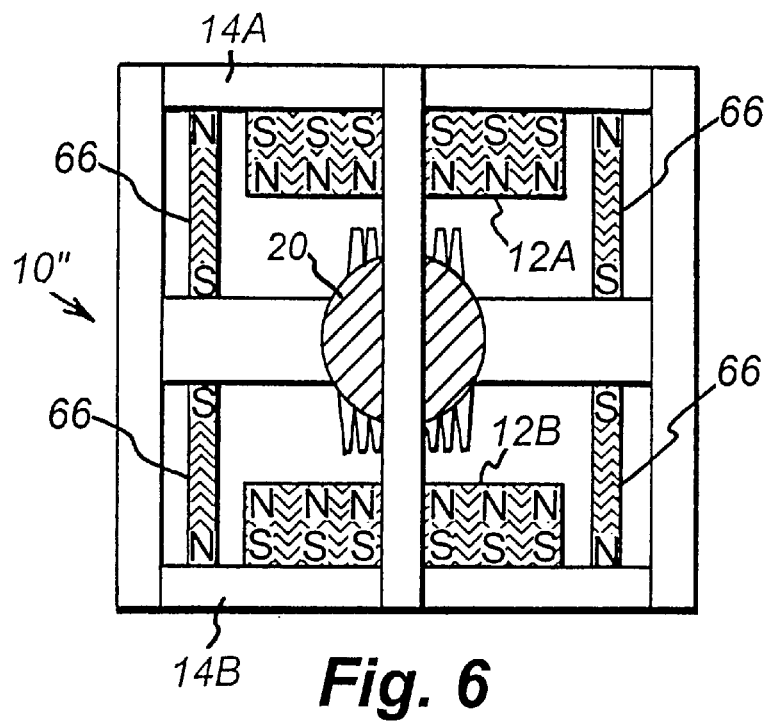
FIG. 6 is a side view of a magnetic actuator element for a third alternative to the embodiment of the invention shown in FIG. 1.

FIG. 6 shows still another actuator element embodiment wherein permanent magnets 66, which are poled in the opposite direction relative to the corresponding permanent magnets 12, serve as the shims between outer cores 14 and central core 18. The theory behind this embodiment is that some of the permanent magnet flux from the magnets 66 can be driven in opposition to the main flux from magnets 12, back through small gaps 38, 40 and 42, thereby reducing the net permanent magnet flux in the E-cores.

Figure 7:
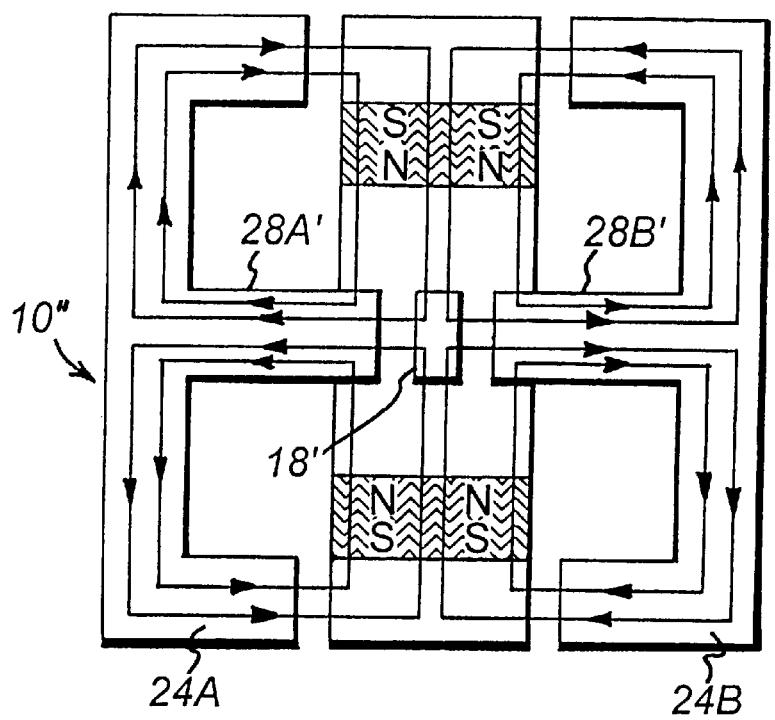
FIG. 7 is a sectional view of the type shown in FIG. 2 of a magnetic actuator element for a fourth alternative to the embodiment of the invention shown in FIGS. 1 and 2.

FIG. 7 shows an actuator element which achieves the objective by increasing the thickness and length of the center leg 28' of each E-core and reducing the thickness of center core 18'. This results in some of the magnetic flux lines passing through the E-cores 24 without passing through center core 18' or through a center gap 38. This reduction in flux makes it less likely that the E-cores will saturate, but is not as effective in achieving this objective as the shims of the prior embodiments.

While materials for the cores, and in particular the E-cores 24 have been discussed above, the materials utilized for the magnets 12 are also important. In particular, a strong magnet is desirable, particularly to keep the voice coil efficient. However, as discussed earlier, too strong a magnet for the actuator will saturate the E-cores and create possible uncontrollable flux. In applications such as space satellite instrumentation, temperature sensitivity is also a consideration (i.e. the ability to handle temperature changes well). Generally, rare earth magnets are ideally suited for this application because of their high magnetization density, Samarium Cobalt and Neodymium Iron Boron magnets being two types of rare earth magnets which are particularly well suited for the application.

The electronic control system for the actuator elements 10 and actuators 52 of this invention will vary with application and the specifics of such control systems do not form part of the present invention. Standard control algorithms are available which may be utilized to control the system for a particular application.

Figure 8:
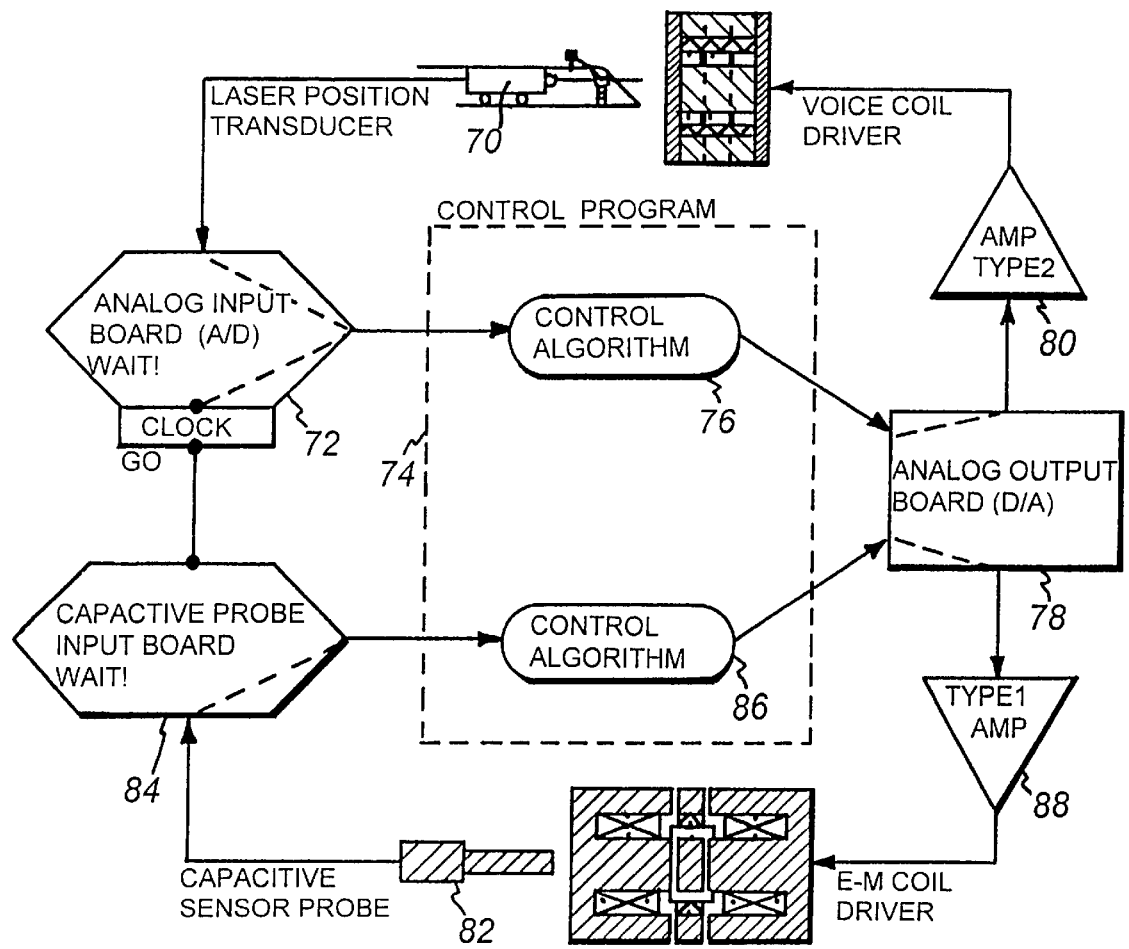
FIG. 8 is a schematic semi-block diagram of a digital control system for use with a single magnetic actuator element of the type shown in FIGS. 1, 2 and 4–7.

FIG. 8 is a simplified diagram of one such control system for a single actuator element 10. Referring to this figure, a standard laser position sensor 70 is shown for detecting the position in the Z direction of the actuator element 10. The position transducer may for example operate by bouncing the laser beam off a mirror mounted to one of the end plates 16. While only a single laser position sensor 70 is shown in FIG. 8, two or more such sensors may be utilized to obtain more accurate position readings, and to provide redundancy in the event of a sensor failure and/or to detect pitch and yaw in addition to merely detecting Z position.

In the implementation shown, the output from the laser position detector is transmitted in analog form and then applied through an analog to digital converter 72, which may also perform a clocking function, to a digital processor 74 which operates on this position input with a suitable control algorithm 76 to generate a digital output to suitably control voice coil 20. In other systems, the laser position transducer output may be transmitted in digital form directly to processor 74. This digital output is applied through a digital to analog converter 78 and an amplifier 80 to the voice coil. Where the actuator is being utilized to perform a scanning function, an AC drive signal may be applied to the voice coil under control of processor 74 and the control algorithm may compare actual position outputs from transducer 70 with the calculated position for the actuator and generate outputs to converter 78 to correct for any deviation between the actual and computed positions.

Similarly, a capacitive sensor probe 82 or other suitable sensor may be utilized to detect the X position of the actuator element platen, and two or more such probes may be utilized to also detect rotation of the platen. These probes for example could sense the size of selected ones of the gaps 40 and 42. The outputs from the capacitive probe or probes are applied through an input board 84, which includes an analog to digital converter, with the outputs from board 84 being applied as inputs to processor 74 where these inputs are operated upon by a suitable control algorithm 86 to generate appropriate digital outputs to maintain the actuator element in a desired equilibrium position. These digital outputs are applied through digital to analog converters 78 and amplifier 88 to appropriate ones of the coils 26 to effect the desired correction.

Attached to this application is an Appendix which is not to be published with the patent, which Appendix contains more detailed information on control circuitry and control algorithms utilized for an illustrative embodiment of the invention. This material also contains mathematical equations and other information useful in designing specific actuator elements and actuators in accordance with the first embodiment of the invention.

One disadvantage of the embodiments shown so far is that each suspension member provides only two degrees of freedom, namely in the X direction and rotary about the core 18 ($\theta_z$). This has two potential disadvantages. First, it requires that three actuator elements be utilized to achieve six degrees of freedom, which actuator elements cannot be colinear, thereby requiring a separate frame assembly 50 (FIG. 3) for such an actuator. Further, since the actuators must be arranged as shown in FIG. 3 (or in one of the other geometric patterns discussed earlier) to achieve six degrees of freedom, actuators cannot easily be linearly stacked, thereby limiting maximum travel in the Z or long travel direction to that which can be provided by a single actuator element. The arrangement of FIG. 3 also increases the size of the actuator which can be a problem in applications such as satellites where space is limited.

Figure 9B:
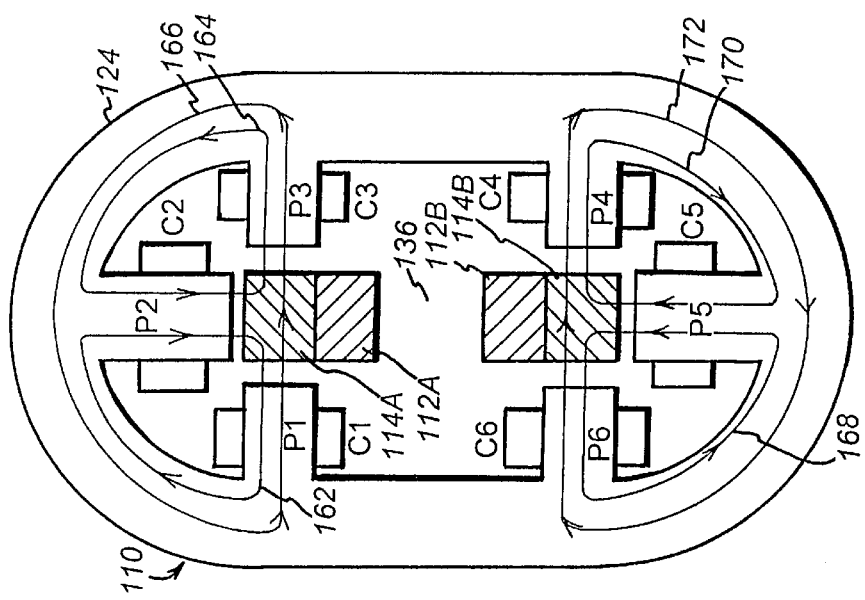
FIGS. 9A, 9B and 9C are front sectional views for a second embodiment of the invention, FIG. 9A illustrating the voice coils, FIG. 9B illustrating flux paths for the suspension elements, and FIG. 9C illustrating the flux paths for the permanent magnets.
Figure 9A:
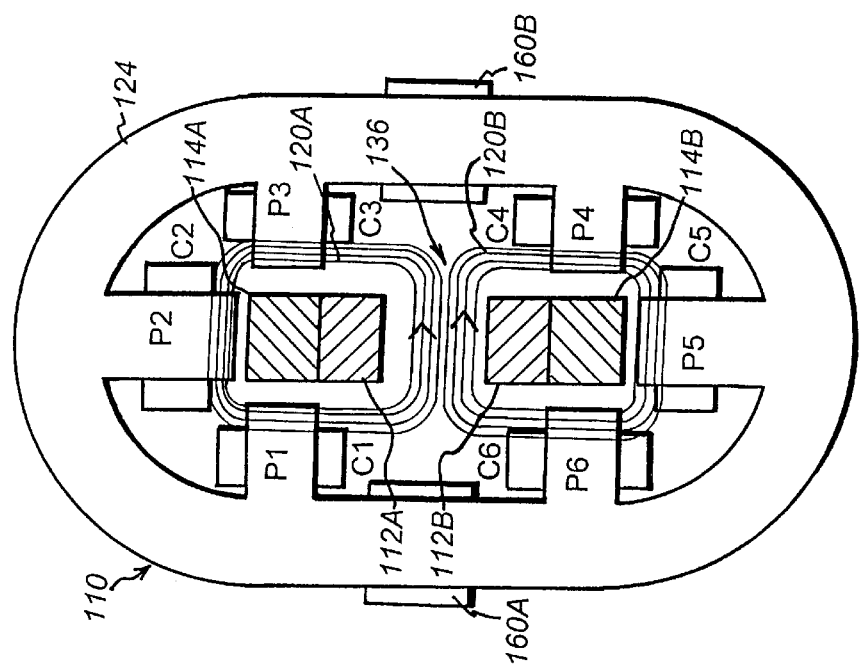

FIGS. 9A–14C illustrate a second embodiment of the invention, including several alternatives of this embodiment, which overcome the problems indicated above. In particular, referring to FIGS. 9A–9C, each actuator element 110 consists of a suspension member which is formed of a core 124 having six poles or legs P1–P6, with a corresponding coil C1–C6 being wound on each of the poles. As may be best seen in FIGS. 11 and 12, a pair of spaced high permeability pole pieces or cores 114A, 114B, formed for example of iron or another ferrous material, pass through the center of each suspension core 124, with core 114A having poles P1, P2 and P3 adjacent three sides thereof and having a permanent magnet 112A attached to the fourth side thereof which side is facing core 114B. Similarly, core 114B passes through core 124 in a manner so as to have poles P4, P5 and P6 on three sides thereof, with a permanent magnet 112B attached to the side thereof adjacent core 114A. A voice coil 120A is wrapped around core 114A and magnet 112A and a voice coil 120B is wrapped around core 114B and magnet 112B. Both voice coils pass through a voice coil gap 136 formed between the magnets 112. A pair of coils 160A, 160B are also shown in FIG. 9A wrapped around the portion of core 124 adjacent to the voice coil gap 136. These coils may be utilized to generate the bias flux in lieu of the magnets 112, but the use of permanent magnets 112 to perform this function is preferred. Therefore, coils 160 would not normally appear for an embodiment of the invention which utilized permanent magnets to provide the bias flux; however it is within the contemplation of the invention that both the coils 160 and the permanent magnets 112 could be utilized for providing bias flux (although there would normally be no reason for doing this).

Referring to FIG. 9B, voice coils 120 have been omitted for purposes of clarity. This figure illustrates the flux paths which can be caused by actuation of the various coils C1–C6. In particular, flux path 162 is produced when coils C1 and C2 are activated and flux path 164 appears when coils C2 and C3 are activated. Flux path 166 appears when coils C1 and C3 are activated. Similarly, flux path 168 appears when coils C5 and C6 are activated, flux path 170 appears when coils C4 and C5 are activated, and flux path 172 appears when C4 and C6 are activated. The direction of the flux paths shown in FIG. 9B are for a particular direction of current flow through the coils and the flux may flow in either direction through the paths 162–172 depending on the direction in which current flows in the corresponding coils.

Figure 9C:
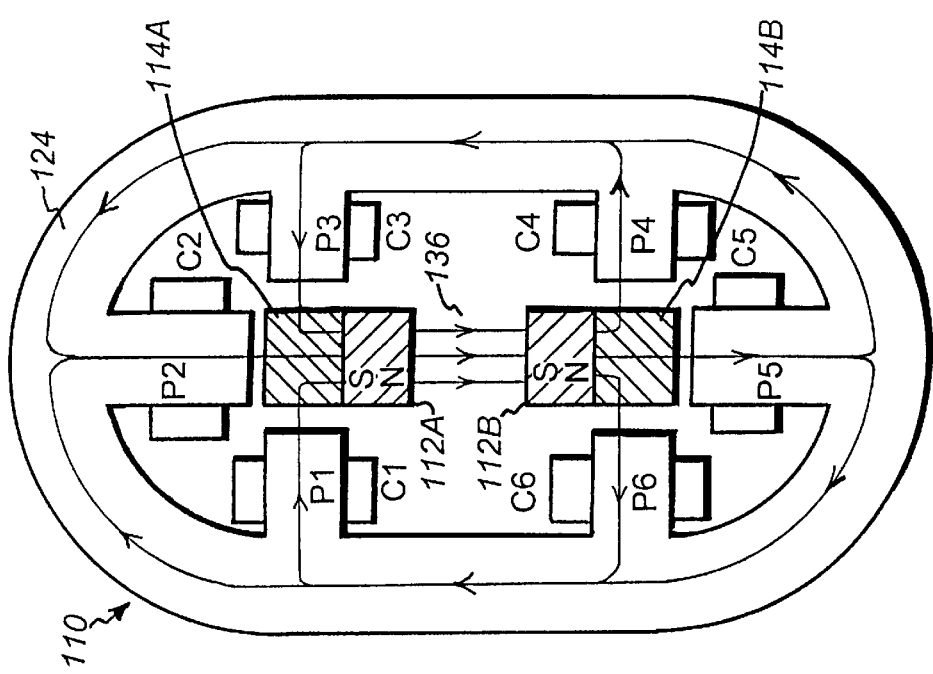

Since the configuration shown in FIGS. 9A–9C has gaps in the Y direction between for example pole P2 and core 114A and between pole P5 and core 114B, by proper actuation of the coils to cause flux in selected directions in some combination of paths 162, 164, 168 and 170, movement in the Y direction can be achieved. Similarly, the gaps between poles P1 and P3 and core 114A and the gaps between the poles P4 and P6 and core 114B permit movement in the X direction by suitable actuation of a selected combination of the coils in a selected direction to control the various flux paths. Further, by proper actuation of the coils, rotation about the Z axis (i.e. in the $\theta_z$ direction) may also be achieved. Reproduced below is Table I illustrating the combination of coil activations required to achieve each type of motion. For purposes of Table I, positive coil currents are assumed to increase the outward-directed flux from the pole on which the corresponding coil is wound. Since it will be assumed as with prior embodiments that the cores 124 are stationary and that the cores 114 and magnets 112 are moving, the movements in the indicated direction occur for the cores and magnets. In the Table, a plus sign means that the coil current should be driven positive to create a force in the desired direction, a minus sign means that the coil current should be driven negative to create the desired force, and a zero indicates that the coil current should be left at zero for this desired force. The number associated with each entry indicates the relative proportion of current change. Each current will typically be increased in this ratio as the desired force is increased. Magnetic non-linearities may change this proportional constant as a function of current and if the core is not initially centered, the required proportion of current will need to be changed correspondingly. Further, for purposes of Table 1, it is assumed that each coil has the same number of turns and that each pole face is of the same area. While this assumption simplifies calculation, and is therefore normally preferred, in some applications the number of turns and/or pole face areas may be varied. When this occurs, the proportionate control of each coil current will require corresponding variations. Such variations can be calculated using well-known magnetic circuit analysis techniques.

TABLE 1

| Direction of Force | Current in C1 | Current in C2 | Current in C3 | Current in C4 | Current in C5 | Current in C6 |
| --- | --- | --- | --- | --- | --- | --- |
| +X | −1 | 0 | +1 | −1 | 0 | +1 |
| −X | +1 | 0 | −1 | +1 | 0 | −1 |
| +Y | −1 | +2 | −1 | −1 | +2 | −1 |
| −Y | +1 | −2 | +1 | +1 | −2 | +1 |
| +$\theta_z$ | +1 | 0 | −1 | −1 | 0 | +1 |
| −$\theta_z$ | −1 | 0 | +1 | +1 | 0 | −1 |

FIG. 9C illustrates the bias fluxes created by the permanent magnets 112, assuming these magnets are polarized as shown in this figure. If the magnets are polarized in the opposite direction, the direction of flow for the bias flux will be in the opposite direction.

Figure 10:
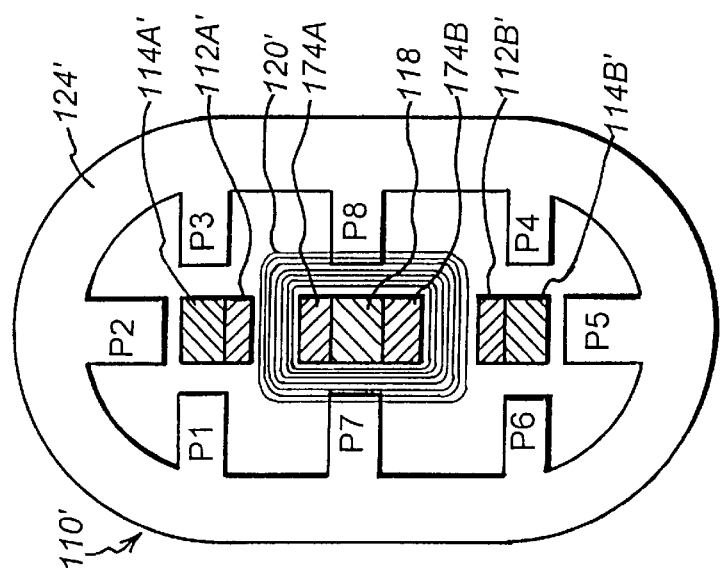
FIG. 10 is a front sectional view of a first alternative to the embodiment of the invention shown in FIGS. 9A–9C.

FIG. 10 illustrates a suspension member 110' which is similar to that shown in FIGS. 9A–9C except that, in addition to the six pole pieces P1–P6 of the earlier embodiment, this embodiment of the invention also has two additional pole pieces, P7 and P8, with pole piece P7 extending between pole pieces P1 and P6 and pole piece P8 extending between pole pieces P3 and P4. While for simplicity of illustration, coils C are not shown in FIG. 10, each pole piece would have a corresponding coil C wrapped thereon which coils would normally be the same, but can be different. Further, in addition to the permanent magnets 112 and cores 114 shown for the earlier embodiment, the embodiment of FIG. 10 also has a core or center pole piece 118 and permanent magnets 174A, 174B mounted on either side of this core. The configuration of FIG. 10 gets back to an E-core configuration and, in addition to providing three degrees of freedom, is capable, because of the greater number of magnets and corresponding gaps, of providing twice as much force for the same power applied to the voice coil. However, the configuration shown in FIGS. 9A–9C is normally preferred because it is smaller, lighter and easier to design and control.

Further, while in FIG. 9A a voice coil is shown mounted to each of the core/permanent magnet combinations 112, 114, two pairs of cores/permanent magnets are required primarily to establish the voice coil gap and the system will operate with a single voice coil, although two voice coils are preferred because it generally makes the system move more smoothly in the Z direction, is generally easier to control, and, most important, provides redundancy, making the actuator less prone to failure. The system may also operate with a single magnet 112 rather than two magnets as shown, with the flux from the magnet flowing through core 114 for which there is no magnet defining the voice coil gap. While this configuration permits a smaller voice coil to be utilized, particularly if the voice coil is wrapped only over the core 114 which does not have a permanent magnet 112, the configuration shown, with two voice coils, is preferred.

Figure 11:
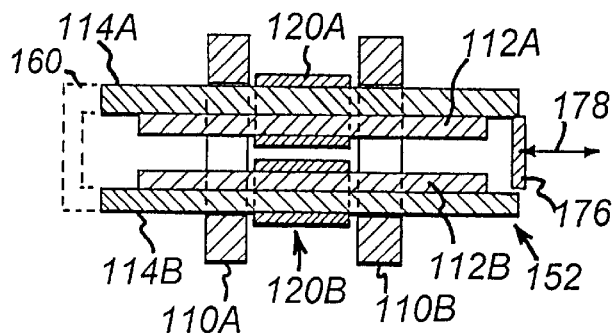
FIG. 11 is a side sectional view of an actuator of the type shown in FIGS. 9A–9C.

FIG. 11 shows an exemplary configuration for an actuator 152 using for example the actuator elements shown in FIGS. 9A–9C. This actuator is shown as having two suspension members 110A and 110B with common cores 114 and permanent magnets 112 passing through both suspension members. A pair of voice coils 120A, 120B are shown mounted around the respective core/permanent magnet combinations at a position between the suspension members 110A and 110B. A shunt 160 is shown connecting cores 114A and 114B on one end of the assembly which shunt performs the same function as the shunt 60 in FIG. 4, namely preventing saturation of the cores 124. While typically the same shunt structure would be used on both sides of an actuator, for purposes of illustration only, a magnet 176 is shown shunting the right side of the actuator 152, this magnet performing the shunt function in the same manner as the magnet 66 in FIG. 6. Arrow 178 indicates the direction of long motion for actuator 152 which is in the Z direction.

One advantage of the configuration shown in FIG. 11 is that it can provide six degrees of freedom with only two actuator elements or suspension members 110. In particular, movement in the Z direction is provided by operating voice coils 120 in the manner previously discussed. Movement in the X or Y direction, or rotation about the Z axis are achieved by operating both actuator elements 110 in accordance with Table 1. Rotation about the X axis (i.e. movement in the $\theta_X$ direction) is achieved by operating one of the actuator elements 110 in one Y direction and the other actuator element 110 in the opposition Y direction, with rotation around the Y axis (i.e. movement in the $\theta_Y$ direction) being similarly achieved by operating one of the actuators to move the cores and permanent magnets in one X direction and the other actuator element to move these elements in the opposite X direction. The mirror or other element to be controlled by the actuator can be mounted to shunt 160 or to a shunt on the opposite side of the actuator. Where shunts are not utilized, an end piece of low magnetic permeability could be provided to which the mirror or other piece is mounted.

Figure 12:
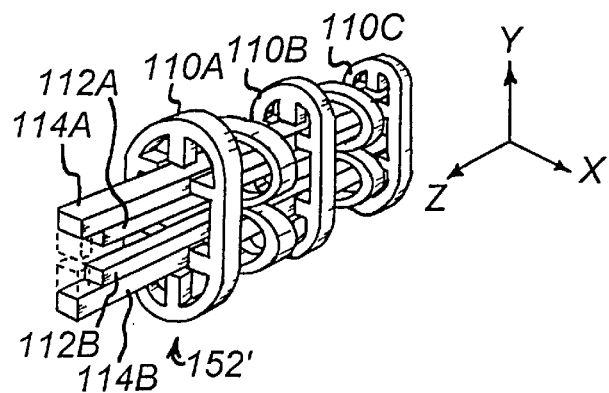
FIG. 12 is a perspective view of a multiple voice coil, multiple suspension member magnetic actuator employing magnetic actuator elements of the type shown in FIGS. 9A–9C to achieve six degrees of freedom with extended motion in the long travel direction.

FIG. 12 shows an actuator 152' which is similar to that of FIG. 11 except that an additional set of voice coils 120 are shown and an additional actuator element 110C is provided. This configuration may be advantageous for at least two reasons. First, it provides redundancy so that the actuator 152' can continue to function even if there are a significant number of failures for one or more voice coils, of an entire actuator element, or of various coils on selected actuator elements. The actuator may therefore be utilized in a hostile and difficult to reach environment, such as in space, for extended periods of time without requiring service. A second advantage of the configuration shown in FIG. 12 is that, with the two sets of voice coils, the distance over which the common cores/permanent magnets may be moved in the Z direction with a limited- length magnet is significantly increased. Additional combinations of voice coils and/or actuator elements may be utilized to achieve greater redundancy and/or increased travel range in the Z direction. One or more voice coils positioned outside the suspension members rather than between suspension members may also be utilized in some applications.

Figure 13:
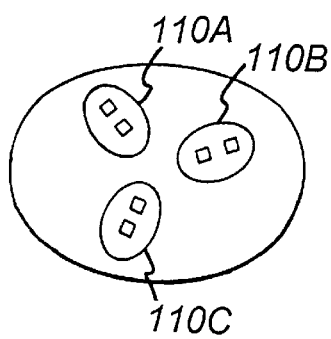
FIG. 13 is a front view of an actuator employing three actuator elements of the type shown in FIGS. 9A–9C to achieve six degrees of freedom.

The advantages of this embodiment of the invention over that described earlier in conjunction with FIGS. 1–8 can be seen in that this embodiment permits six degrees of freedom to be achieved with only a single voice coil or pair of voice coils and with only two suspension members or actuator elements, and still provides some redundancy in control, while the first embodiment required at least three voice coils and at least three suspension members to achieve six degrees of freedom with less redundancy. The FIG. 12 embodiment, with less structure than that required for the embodiment of FIG. 3, provides for longer travel and far greater redundancy, while providing a device having significantly smaller overall dimensions. This embodiment is therefore preferred. FIG. 13 shows an alternative embodiment wherein three actuator elements 110 are mounted in a triangular pattern to achieve the six degrees of freedom in much the same way as the embodiment of FIG. 3. Since this embodiment requires more hardware and has a larger profile than for example the embodiment of FIG. 11 or FIG. 12, this embodiment is not preferred.

Figure 14A:
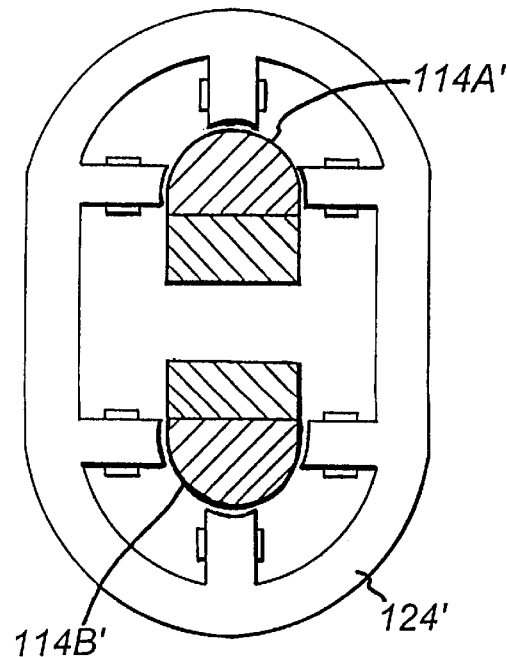
FIGS. 14A–14C are front sectional views of three additional alternatives to the embodiment of the invention shown in FIGS. 9A–9C.
Figure 14B:
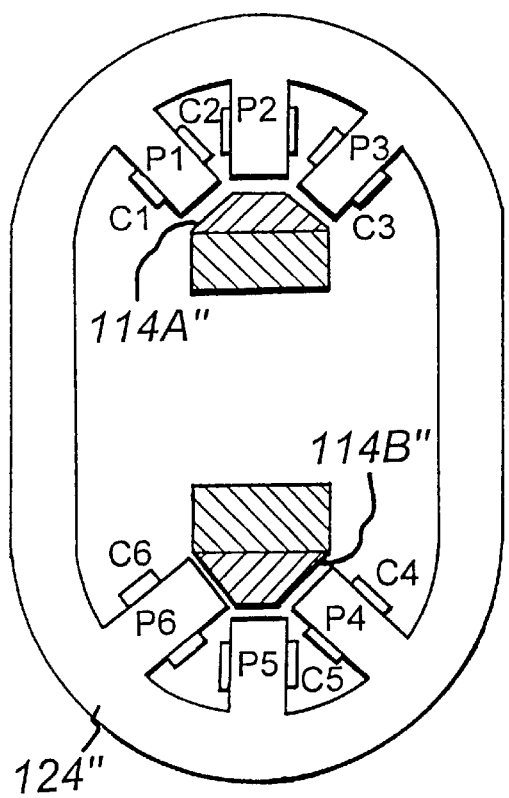
Figure 14C:
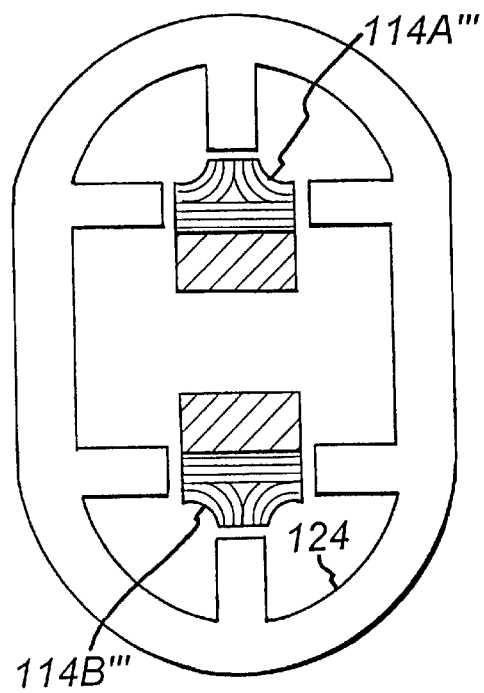

FIGS. 14A, 14B and 14C show three additional alternatives for the second embodiment of the invention. In FIG. 14A the cores 114' are dome shaped, with each of the poles P1–P6 being shaped to match the shape of the adjacent portion of the core. This configuration provides a larger gap area per core volume than for standard poles and pole pieces and provides control forces at a variety of angles which may provide better position control in some applications.

FIG. 14B differs from FIG. 14A in that the cores 114A" and 114B" have a truncated pyramid shape and pole pieces P1, P3, P4, and P6 are angled to mate with the corresponding core surface rather than being at right angles to the pole pieces P2 and P5 respectively as for the other embodiments. Again, this configuration provides larger gap areas per core volume for position control. This also allows more room in the center of the structure for any payload which may be attached to the moving core. With this configuration, it may also be possible to eliminate coils C2 and C5 so that pole pieces P2 and P5 function only as flux paths, the remaining pole pieces and cores being capable of providing movement in both the X and Y direction.

FIG. 14C differs from the prior embodiments in that the cores 114'" have a novel lamination pattern as shown rather than being laminated in only one direction, for example the horizontal direction, as shown for the cores in FIGS. 14A and 14B. This core lamination pattern provides superior high frequency response in all three axes. Similar high frequency response can be obtained by forming the cores of ferrite or amorphous metal (Metglas). Except for the difference in the lamination pattern and shape of the cores, the embodiment of FIG. 14C is the same as that for FIGS. 9A–9C. Other cores, such as suspension cores or return cores for the various embodiments, may also be suitably laminated.

Figure 15:
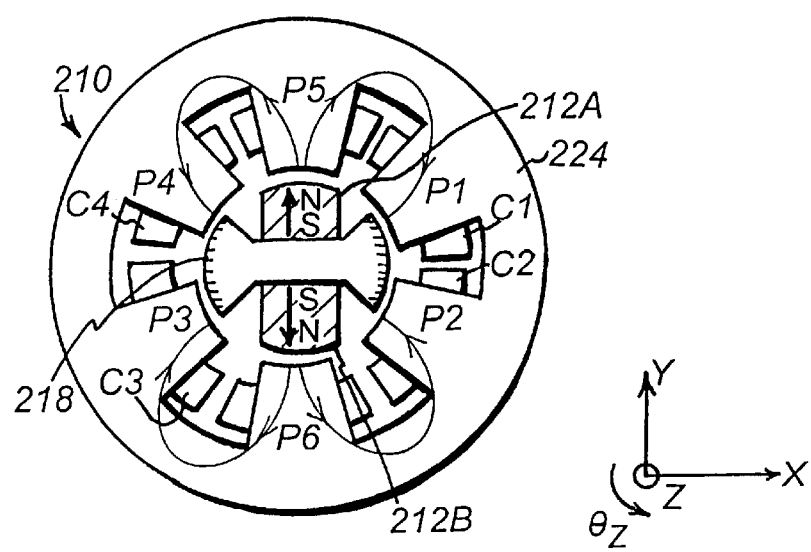
FIGS. 15, 16, 17 and 18 are front sectional views of actuator elements for four alternatives to a third embodiment of the invention.

FIGS. 15–21 illustrate several alternatives for a third embodiment of the invention which is generally easier to fabricate than the other embodiments, and in particular the embodiments shown in FIGS. 9A–14C, while still offering all of the advantages of these embodiments. FIGS. 15–18 illustrate various actuator elements or suspension member configurations 210 which may be used for this embodiment of the invention. In FIG. 15 the core 224 for the actuator element, which core as for the other embodiments is formed of a high permeability material, is generally disc shaped in cross-section with a slotted circular cutout in its center. The slots result in the formation of pole pieces P1–P6, with coils C1–C4 being wrapped respectively on poles P1–P4 and with no coils being wrapped on poles P5 and P6. Poles P5 and P6 therefore serve as flux paths for the permanent magnets and not for the coil induced fluxes. The voice coil may be mounted so as to pass through the gaps formed between poles P5, P6 and the corresponding permanent magnets facing these poles. For clarity, this voice coil is not shown in the figure. Return cores to be mentioned later may also butt against these pole pieces. A core 218 having substantially circular flared ends passes through the central opening in core 224. A pair of permanent magnets 212A and 212B are mounted above and below respectively the thinner non-flared portion of core 218 and can also pass through the central opening in core 224 with core 218. The outer edges of each magnet are curved to match the curve of the internal core opening. Shims having similar curves may extend upward from each end of core 218.

Figure 16:
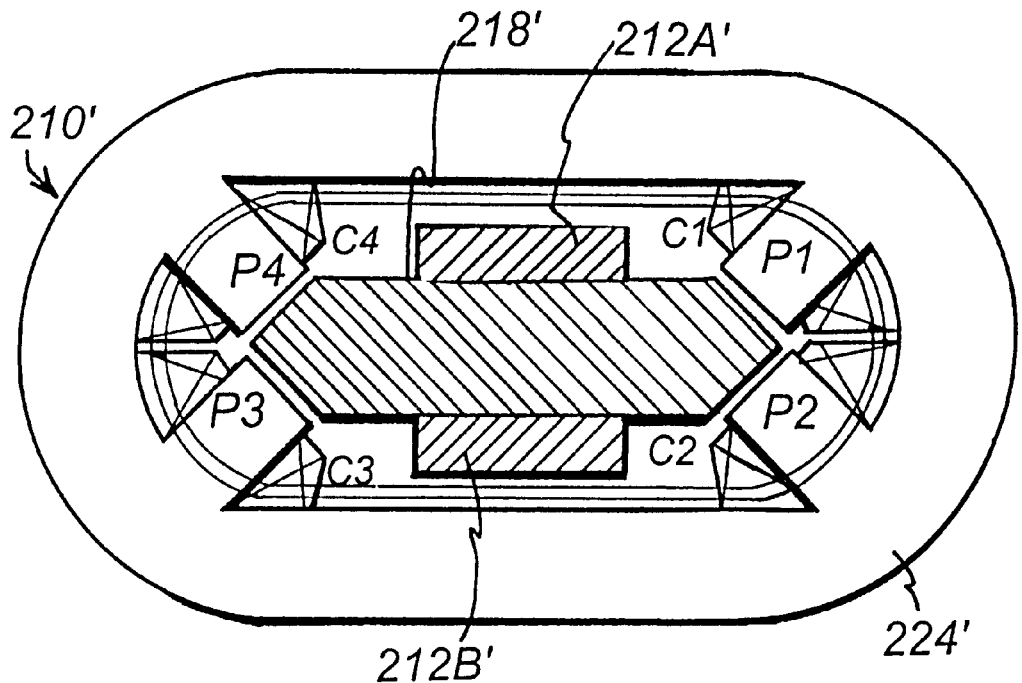

The actuator element of FIG. 16 differs from that of FIG. 15 in that core 224' has an elongated oval shape and that core 218' is pointed on each side rather than flaring, with the pointed ends fitting between pole pieces P1 and P2 on one side and between pole pieces P3 and P4 on the other side. Because the elongated shape permits the top and bottom walls of core 224' to be relatively close to the magnets 212, pole pieces P5 and P6 are not required for this embodiment either for the permanent magnet flux path or for return cores to butt against. Moving the pole pieces outward as shown in FIG. 16 may be advantageous in some applications in that it gets magnets 212 away from the pole pieces P1–P4 and thereby reduces fringing effects.

Figure 17:
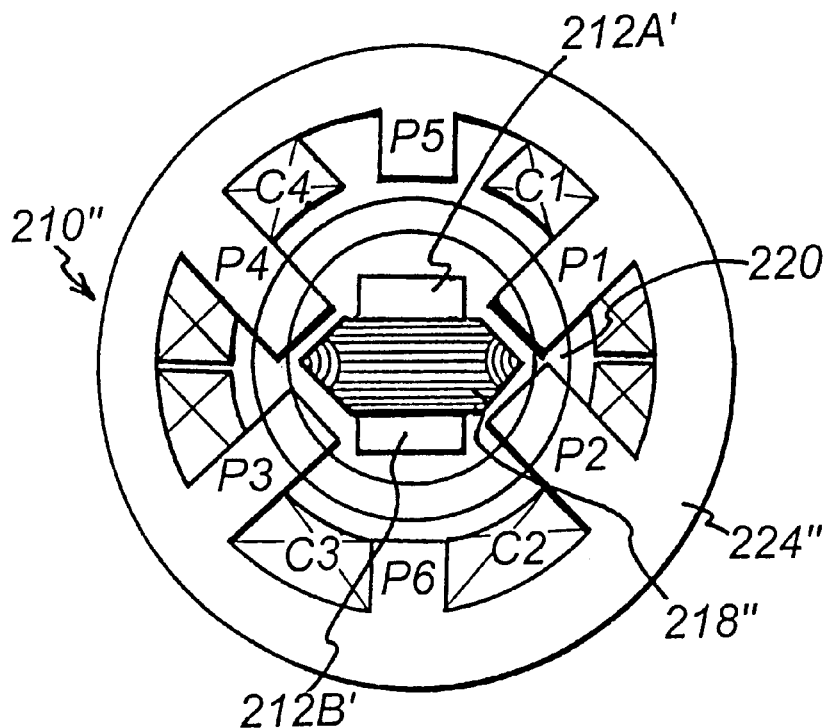

FIG. 17 shows an embodiment which is a hybrid in some ways of FIGS. 15 and 16 in that core 224" is circular, but core 218" has the pointed sides. Core 218" also has the laminar construction which facilitates high frequency operation. Pole pieces P5 and P6 are present for this embodiment to provide a low reluctance path for magnetic flux from magnets 212 to the return cores and pole pieces P1, P2, P3 and P4 are shaped and positioned to be adjacent to the angled sides of core 218" with the small positioning gaps therebetween. The position for voice coil 220, which is positioned around magnets 212, either in front of or behind core 224, is also shown in FIG. 17. The voice coil not shown in FIG. 15 would be positioned similarly.

Figure 18:
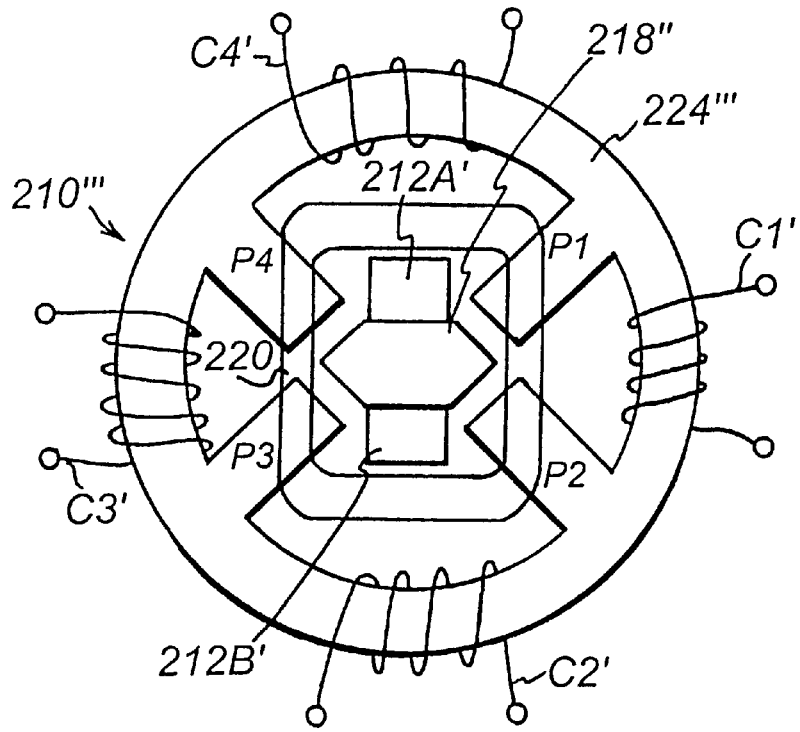

The actuator element of FIG. 18 is similar to that of FIG. 17 except that the core 224'" does not have poles P5 and P6 and the control windings, rather than being wrapped on pole pieces P1–P4, are instead wound on core 224'" between the poles. Thus, winding C1' is wrapped on the core between pole pieces P1 and P2 and produces a flux path which flows through these two pole pieces. Similarly, winding C2' is positioned between pole pieces P2 and P3, winding C3' is positioned between pole pieces P3 and P4, and winding C4' is positioned between pole pieces P4 and P1. In each instance, current applied to the winding results in a flux path through the adjacent pole pieces. To create a flux path through a desired set of poles, the currents in all four coils would be energized in the proper proportions. The correct proportions can be calculated via well-established magnetic field theory relationships. The core 224'" shown in FIG. 18 may also be utilized with windings on the pole pieces P1–P4 rather than on the core as shown.

Figure 19:
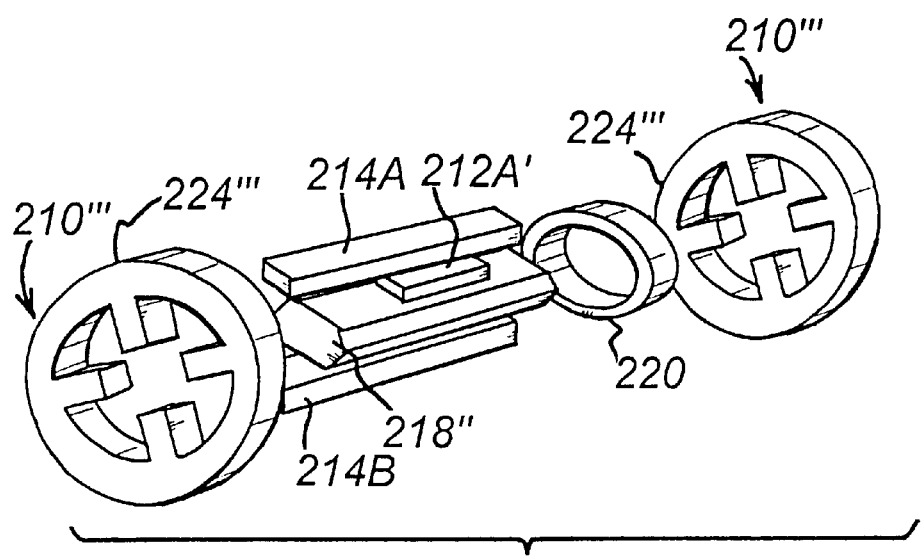
FIG. 19 is an exploded perspective view of an actuator employing elements similar to those shown in FIG. 17 or 18.

FIG. 19 shows an actuator formed with two actuator elements 210'" which may be of the type shown in FIG. 18 or may have windings on the poles (the windings not being shown in FIG. 19 to simplify the drawing). The cores 224 fit over core 218 when the actuator is assembled and magnets 212 may pass through the cores 210'" depending on the extent of movement. A single voice coil 220 is mounted around magnets 212 in the gap between these magnets and return cores 214A, 214B. These return cores extend between and are preferably in physical contact with an outer wall of each adjacent suspension core 224, but may be spaced by a small gap therefrom.

The flux paths for the permanent magnets for all of the embodiments shown is out of the magnets and through the voice coil gaps and return cores 214 to suspension cores 224, through pole pieces P1–P4 of the suspension cores to center core 218 and back to the magnets 212. It can thus be seen that this path provides not only flux for the voice coil gap, but also flux for each of the pole piece gaps for the pole pieces P1–P4. This bias flux from the permanent magnet may be added to or subtracted from by applying currents to selected combinations of the coils C1–C4 to correct for small variations in five degrees of freedom (all directions but the Z direction which is controlled by the voice coil). Fluxes generated by any of the coils C1–C4, flow in or out of the corresponding pole pieces according to the laws of magnetic field theory. By selectively energizing some combination of these cores, in selected directions, X, Y and $\theta_Z$ movement may be achieved at each actuator element 210.

The embodiment of FIG. 15 is particularly advantageous in that it permits a much larger rotational capability than any of the other embodiments heretofore shown. In particular, while other embodiments permit rotational movement of only one or two degrees, $\theta_Z$ movements of approximately ±20° may be achieved with the configuration shown in FIG. 15. Specifically, rotation is achieved by making pole pieces P5 and P6 wider than magnets 212 so that the magnets overlap with these poles for all allowed rotations. Poles P1–P4 overlap the core 218 only partially. In order to effect rotation in $\theta_Z$, the poles P1 and P3 would be strengthened and the poles P2 and P4 weakened by energizing coils C1–C4. To rotate in the $-\theta_Z$ direction, the coil excitations would be reversed. The allowable amount of rotation is determined by the range in which some amount of core 218 overlaps with at least part of each pole P1–P4 and in which magnets 212 overlap with poles P5 and P6. Motions in the X and Y direction are accomplished by energizing the coils to strengthen or weaken the appropriate poles P1–P4 in a manner similar to that described earlier in association with Table 1. For example, to move the core 218 in the X direction, poles P1 and P2 would be strengthened while poles P3 and P4 are weakened, by appropriately actuating coils C1–C4. To move in the −X direction, the excitation would be reversed. To move in the Y direction, poles P1 and P4 would be strengthened while poles P2 and P3 are weakened. To move in the −Y direction, the excitation would be reversed. The sign of the currents required to achieve the pole strengthening or weakening depends upon the choice of the direction of magnetization of the magnets 212 and the direction in which the coils C1–C4 are wound. If the magnets 212 are poled as shown, with their north poles facing away from core 218, and if a positive current in coils C1–C4 is taken to drive magnetic flux out of the corresponding pole face P1–P4, then the following Table 2 can be constructed to indicate the coil excitations required to effect movements of core 218 in the indicated directions.

TABLE 2

|  | C1 | C2 | C3 | C4 |
| --- | --- | --- | --- | --- |
| $\theta_z$ | +1 | −1 | +1 | −1 |
| $-\theta_z$ | −1 | +1 | −1 | +1 |
| X | +1 | +1 | −1 | −1 |
| −X | −1 | −1 | +1 | +1 |
| Y | +1 | −1 | −1 | +1 |
| −X | −1 | +1 | +1 | −1 |

Other coil patterns or orientations of magnets 212 will require correspondingly modified excitations to effect movement in the desired directions. Further, all that is required is that the ends of pole piece 218 in FIG. 15 be substantially circular; the flared ends being advantageous only for providing greater overlap with the poles and thus greater rotation. Therefore flared ends need not be used where large rotations are not required. However, even with non-flared ends, this embodiment provides greater rotation than other embodiments.

Referring to FIG. 19, X, Y and $\theta_Z$ movement for the moving elements 212 and 218 are achieved by operating both actuator elements 224 in the same way to achieve these motions, while rotations about the X and Y axis ($\theta_X$ and $\theta_Y$) rotations, are achieved as discussed for the prior embodiment, by operating the two actuator elements to move in opposite Y or opposite X directions respectively.

Figure 21:
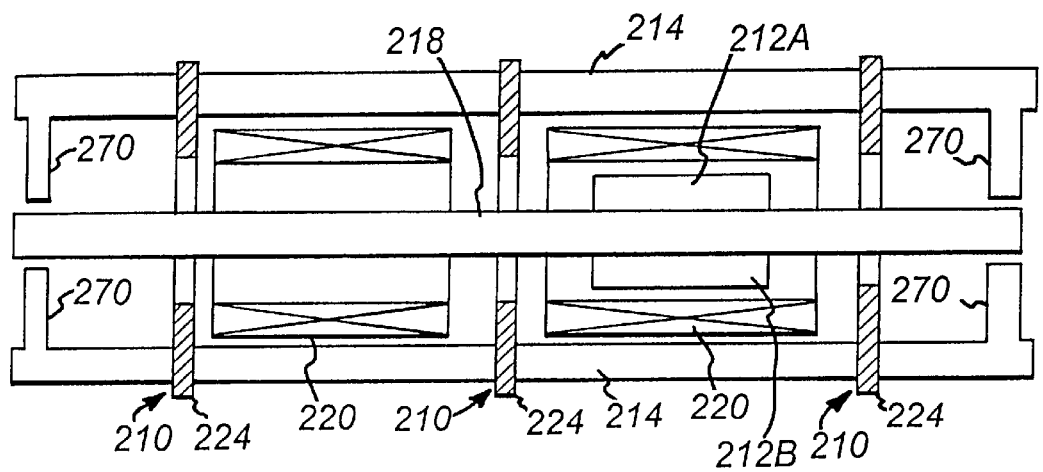
FIG. 21 is a side sectional view of an alternative actuator employing actuator elements of the type shown in FIGS. 15–18 which actuator provides for longer travel in the long travel direction.

FIG. 21 shows an alternative version of this embodiment which is similar to the version of the earlier embodiment shown in FIG. 12, with multiple voice coils and multiple actuator elements to provide redundancy and to also permit longer travel than is otherwise possible. The mirror or other work piece could for example be mounted to center core 218 at for example the left end thereof. FIG. 21 also illustrates shunts 270 extending from each end of return cores 214 and spaced by a small gap from center core 218 as discussed earlier, by controlling the thickness of the shunts 270 and the size of the gaps between these shunts and center core 218, a selected portion of the magnetic flux which would otherwise pass through cores 224 and the gaps for poles P1–P4 may by shunted to permit higher flux in the voice coil gap where it is required without saturating the actuator element cores 224.

Figure 20:
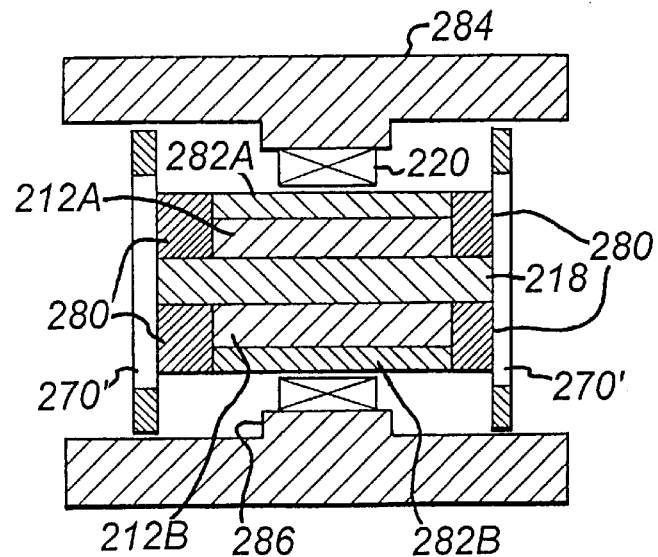
FIG. 20 is a side sectional view of an alternative actuator utilizing actuator elements of the general type shown in FIGS. 15–18.

FIG. 20 shows a final embodiment of the invention which differs from those previously shown in that an additional core 282A, 282B is provided on the side of each magnet 212 opposite center core 218, non-magnetic spacers 280 are provided on the ends of each movable assembly and an outer shell 284 is provided of a magnetically permeable material which shell has a projecting ring 286 surrounding voice coil 220. The effect of the configuration shown in FIG. 20 is to concentrate flux into the voice coil, providing more power to the electrodynamic drive in the long travel or Z direction. Shunts 270' are also shown which serve the same function as in FIG. 21. Suspension cores 224 are omitted from this figure for clarity, but would preferably be configured to act on core 218 in a manner similar to that shown in FIGS. 15–19.

While the invention has been described above with respect to preferred embodiments, it is apparent that many variations in the details of design are possible. For example, FIGS. 4, 5 and 6 illustrate the position of the E-cores relative to the voice coil as overlapping, with portions of the voice coil being on opposite sides of the E-core, rather than with the E-cores and the voice coils being adjacent to each other as shown in FIG. 1. Either of these designs is acceptable and the E-cores and voice coils may also be spaced from each other in the Z direction. The magnets 12 are also shown longer in these figures and the arrangement with the magnets longer is considered preferred. In other embodiments, the coils may be longer than the magnets. Windings 26 may also be on the center leg 28 and upper and lower legs 30 and 32 of each E-core rather than as shown in FIG. 2 to provide the desired supplemental flux to the small gaps 38, 40 and 42. The relative size and shapes of the various components including the gap sizes may also vary with application for all of the embodiments and the alternatives thereof. The size and shape of the cores 124 and 224 may also vary in ways in addition to those shown as may the shapes of the cores passing therethrough, with the shapes of the poles in each instance being adjusted to conform to that of the cores. The second embodiment may also have an alternative such as that shown in FIG. 18, with the windings on the suspension core rather than on the poles. Windings could also be put on the shims for the third embodiment to perform further control functions.

Thus, while the invention has been particularly shown and described above with reference to preferred embodiments, the foregoing and other changes in form and detail may be made therein by one skilled in the art without departing from the spirit and scope of the invention.

What is claimed is:

1. An actuator element for providing long travel in a first dimension and short travel in at least one additional dimension comprising:

an electrodynamic drive for providing controlled movement in said first dimension, said drive including a single phase, noncommutated voice coil mounted in a voice coil gap and at least one elongated high permeability core which is movable in the first dimension with respect to the voice coil;

an electromagnetic drive for providing controlled movement in said at least one additional dimension, said drive including at least one high permeability suspension core spaced from said at least one elongated core by small gaps, and windings for selectively inducing fluxes in said small gaps; and a magnetic source for providing a bias flux to both said voice coil gap and said small gaps.

2. An actuator element as claimed in claim 1 wherein said magnetic source includes at least one permanent magnet mounted to a said elongated core on at least one side of said voice coil gap.

3. An actuator element as claimed in claim 1 including means for reducing the magnet flux in said at least one suspension core to prevent saturation of said electromagnetic drive.

4. An actuator element as claimed in claim 3 wherein said means for reducing includes shims for diverting magnetic flux away from said suspension cores by providing a parallel bypass path for said suspension cores for some of said flux.

5. An actuator element as claimed in claim 4 wherein said shims provide at least one high magnetic permeability bypass path.

6. An actuator element as claimed in claim 4 wherein said shims provide at least one bypass gap which bypass gap is much shorter and much narrower than said voice coil gap.

7. An actuator element as claimed in claim 4 wherein said shims provide at least one narrow high magnetic permeability bypass path for said suspension cores.

8. An actuator element as claimed in claim 4 wherein said shims are permanent magnet shims.

9. An actuator element as claimed in claim 1 wherein said voice coil and said at least one suspension core are stationary and wherein said at least one elongated core and said source are connected to form part of a moving platen.

10. An actuator element as claimed in claim 1 wherein said at least one elongated core includes a center core around which said voice coil is wound and a pair of outer return cores, voice coil gaps being formed between the center core and each return core; and wherein each said at least one suspension core includes a pair of high permeability E-cores spaced from the center core and the return cores by small gaps.

11. An actuator element as claimed in claim 10 wherein said source includes a permanent magnet mounted to each return core between the return core and the center core.

12. An actuator element as claimed in claim 1 wherein at least one of said elongated core and said suspension core are laminated to provide superior high frequency response.

13. An actuator element as claimed in claim 1 wherein said electrodynamic drive provides controlled movement in one linear dimension, wherein said electromagnetic drive provides controlled movement in two additional linear dimensions and in at least one rotary dimension, and wherein said at least one suspension core has poles angled to provide force components in both of said two additional linear dimensions.

14. An actuator element as claimed in claim 13 wherein there are windings either on or between sufficient ones of said pole pieces to provide controlled forces in at least said two additional linear dimensions and said at least one rotary dimension.

15. An actuator element as claimed in claim 13 wherein there are at least two of said elongated cores, at least one of which passes through a said voice coil, and wherein said at least one suspension core has at least two pole pieces adjacent each elongated core, the pole pieces being shaped and angled relative to the corresponding elongated core to apply forces thereto having components in said two additional linear dimensions when currents are applied to windings corresponding to said pole pieces.

16. An actuator element as claimed in claim 15 wherein the magnetic source includes a permanent magnet affixed to each elongated core on the side thereof adjacent the other elongated core.

17. An actuator element as claimed in claim 13 wherein there is a single elongated core having magnets mounted to opposite sides thereof, the elongated core and magnets passing through a said voice coil; and wherein the elongated core passes between pole pieces of said at least one suspension core which pole pieces are shaped and angled to apply forces to said elongated core having components in said two additional linear dimensions.

18. An actuator element as claimed in claim 17 wherein said at least one suspension core has a substantially circular internal opening through which at least said elongated core passes, which opening is slotted to form said pole pieces, and wherein said elongated core has substantially circular sides adjacent said pole pieces.

19. An actuator element as claimed in claim 17 wherein said elongated core has sides which angle outward from the top and bottom to a point, and wherein said at least one suspension core has a pole piece forming a small gap with each angled side.

20. An actuator element as claimed in claim 17 including a pair of return cores substantially parallel to the elongated core and spaced therefrom, said return cores terminating at said at least one suspension core.

21. An actuator providing long travel in a first dimension and short travel in five additional dimensions comprising:

at least three actuator elements of the type claimed in claim 1 interconnected so that they all have their long travel in said first dimension.

22. An actuator providing long travel in a first dimension and short travel in five additional dimensions comprising:

at least one electrodynamic drive for providing controlled movement in said first dimension, said drive including a single phase, noncommutated voice coil mounted in a voice coil gap and at least one elongated high permeability core, the core and voice coil being movable in the first dimension with respect to each other;

at least two electromagnetic drives each providing controlled movement in at least one additional dimension, each said drive including at least one high permeability suspension core spaced from the at least one elongated core by small gaps, said drives being spaced from each other along the at least one elongated core, and windings for selectively inducing fluxes in said small gaps;

and a magnetic source for providing a bias flux to both said voice coil gap and said small gaps for both electromagnetic drives.

23. An actuator as claimed in claim 22 wherein said electrodynamic drive provides controlled movement in one linear dimension, wherein said electromagnetic drives each provide controlled movement in two additional linear dimensions and in at least one rotary dimension, and wherein said at least one suspension core for each electromagnetic drive has pole pieces angled to provide force components in both of said two additional linear dimensions.

24. An actuator as claimed in claim 23 wherein there are windings either on or between sufficient ones of said pole pieces to provide controlled forces in at least said two additional linear dimensions and said at least one rotary dimension.

25. An actuator as claimed in claim 22 wherein there are at least two of said elongated cores, at least one of which passes through a said voice coil, and wherein each said suspension core has at least two pole pieces adjacent each elongated core, the pole pieces being shaped and angled relative to the corresponding elongated core to apply forces thereto having components in said two additional linear dimensions when currents are applied to windings corresponding to said pole pieces.

26. An actuator as claimed in claim 22 wherein there is a single elongated core having magnets mounted to opposite sides thereof, the elongated core and magnet passing through a said voice coil; and wherein the elongated core passes between pole pieces of each said suspension core which pole pieces are shaped and angled to apply forces to said elongated core having components in said two additional linear dimensions.

27. An actuator as claimed in claim 26 wherein each said suspension core has a substantially circular internal opening through which at least said elongated core passes, which opening is slotted to form said pole pieces, and wherein said elongated core has substantially circular sides adjacent said pole pieces.

28. An actuator as claimed in claim 26 wherein said elongated core has sides which angle outward from the top and bottom to a point, and wherein each said suspension core has a pole piece forming a small gap with each angled side.

29. An actuator as claimed in claim 26 including a pair of return cores substantially parallel to the elongated core and spaced therefrom, each said return core terminating at and being in contact with a pair of spaced suspension cores.

30. An actuator as claimed in claim 22 including means for reducing the magnetic flux in said suspension cores to prevent saturation of said electromagnetic drive.

31. An actuator element for providing long travel in a first linear dimension and short travel in two additional linear dimensions and in at least one rotary dimension comprising:

an electrodynamic drive for providing controlled movement in said first linear dimension, said drive including a single phase, noncommulated voice coil mounted in a voice coil gap and at least one elongated high permeability core which is movable in the first dimension with respect to the voice coil;

an electromagnetic drive for providing controlled movement in said two additional linear dimensions and at least one rotary dimension, said drive including at least one high permeability suspension core spaced from said at least one elongated core by small gaps, and windings for selectively inducing fluxes in said small gaps, said at least one suspension core having poles angled to provide force components in both of said two additional linear dimensions; and a magnetic source for providing a bias flux to both said voice coil gap and said small gaps.

32. An actuator element as claimed in claim 31 wherein said magnetic source includes at least one permanent magnet mounted to a said elongated core on at least one side of said voice coil gap, said magnet being elongated in said first direction.

33. An actuator element as claimed in claim 31 including means for reducing the magnet flux in said small gaps to prevent saturation of said electromagnetic drive.

34. An actuator as claimed in claim 33 wherein said means for reducing includes shims for diverting magnetic flux away from said suspension cores by providing a parallel bypass path for said suspension cores for some of said flux.

35. An actuator as claimed in claim 31 wherein at least one of said elongated core and said suspension core is laminated to provide superior high frequency response in at least said two additional linear dimensions.

36. An actuator as claimed in claim 31 wherein there are windings either on or between sufficient ones of said pole pieces to provide controlled forces in at least said two additional linear dimensions and said at least one rotary dimension.

37. An actuator as claimed in claim 31 wherein there are at least two of said elongated cores, at least one of which passes through a said voice coil, and wherein said at least one suspension core has at least two pole pieces adjacent each elongated core, the pole pieces being shaped and angled relative to the corresponding elongated core to apply forces thereto having components in said two additional linear dimensions when currents are applied to windings corresponding to said pole pieces.

38. An actuator as claimed in claim 37 wherein the magnetic source includes a permanent magnet affixed to each elongated core on the side thereof adjacent the other elongated core.

39. An actuator as claimed in claim 31 wherein there is a single elongated core having magnets mounted to opposite sides thereof, the elongated core and magnets passing through a said voice coil; and wherein the elongated core passes between pole pieces of said at least one suspension core which pole pieces are shaped and angled to apply forces to said elongated core having components in said two additional linear dimensions.

40. An actuator as claimed in claim 39 wherein said at least one suspension core has a substantially circular internal opening through which at least said elongated core passes which opening is slotted to form said pole pieces, and wherein said elongated core has substantially circular sides adjacent said pole pieces.

41. An actuator as claimed in claim 39 wherein said elongated core has sides which angle outward from the top and bottom to a point, and wherein said at least one suspension core has a pole piece forming a small gap with each angled side.

42. An actuator as claimed in claim 39 including a pair of return cores substantially parallel to the elongated core and spaced therefrom, said return cores terminating at and being in contact with said at least one suspension core.

* * * * *